United States Patent
Pippin

(10) Patent No.: US 8,651,794 B2
(45) Date of Patent: Feb. 18, 2014

(54) AUTOMATED BED-LOADED CONTAINER UNLOADER AND METHOD

(75) Inventor: James Moody Pippin, Keller, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 233 days.

(21) Appl. No.: 13/091,583

(22) Filed: Apr. 21, 2011

(65) Prior Publication Data

US 2012/0087770 A1    Apr. 12, 2012

Related U.S. Application Data

(60) Provisional application No. 61/326,876, filed on Apr. 22, 2010.

(51) Int. Cl.
| | |
|---|---|
| *B65G 69/28* | (2006.01) |
| *B65G 67/02* | (2006.01) |
| *B65G 69/00* | (2006.01) |
| *B65G 67/24* | (2006.01) |

(52) U.S. Cl.
USPC ..... 414/398; 414/395; 414/797.6; 414/798.1; 198/308.1

(58) Field of Classification Search
USPC ........... 198/308.1, 339.1, 341.03, 506, 510.1, 198/512, 517, 587, 588, 594, 618, 803.16, 198/804, 810.01, 810.04, 813, 844.1, 866; 271/121, 35; 414/298, 345, 393, 395, 414/398, 399, 400, 480, 490, 494, 528, 680, 414/797.4, 797.6, 798.1, 798.2, 798.9, 929, 414/FOR. 107
See application file for complete search history.

(56) References Cited

U.S. PATENT DOCUMENTS

| | | | |
|---|---|---|---|
| 2,572,945 A * | 10/1951 | Quesnoit | 414/480 |
| 3,186,566 A | 6/1965 | Spinanger et al. | |
| 3,435,950 A | 4/1969 | Suverkrop | |
| 3,827,585 A * | 8/1974 | McWilliams | 414/398 |
| 3,836,021 A * | 9/1974 | McWilliams | 414/398 |
| 4,113,122 A | 9/1978 | Lutz | |

(Continued)

FOREIGN PATENT DOCUMENTS

| | | | |
|---|---|---|---|
| DE | 102009022527 A1 | 12/2010 | |
| JP | 2001072226 A * | 3/2001 | B65G 43/04 |

(Continued)

OTHER PUBLICATIONS

PCT Search Report mailed Jul. 13, 2011 corresponding to PCT International Application No. PCT/US11/33521 filed Apr. 22, 2011 (13 pages).

(Continued)

*Primary Examiner* — Gregory Adams

(57) ABSTRACT

An automated unloading apparatus, system and method for use with a container having a plurality of items located on a base belt. The apparatus includes a ramp, a conveyor, a stack control curtain, and a tensioning mechanism. The ramp is configured to pass under the base belt. The conveyor is configured to remove a first item from the plurality of items. The stack control curtain is configured to retain a second item of the plurality of items during removal of the first item. The tensioning mechanism is configured to couple to the base belt and maintain a desired tension on the base belt during passage of the nose ramp under the base belt and removal of the first item.

21 Claims, 7 Drawing Sheets

(56) References Cited

U.S. PATENT DOCUMENTS

| | | |
|---|---|---|
| 4,274,789 A | 6/1981 | Martin et al. |
| 5,256,021 A | 10/1993 | Keip et al. |
| 5,538,391 A * | 7/1996 | Bonnet ................ 414/796.5 |
| 5,902,089 A | 5/1999 | Bloome |
| 6,164,432 A * | 12/2000 | Monsees ................ 198/459.4 |
| 2004/0033126 A1* | 2/2004 | Thogersen .................... 414/398 |
| 2004/0165980 A1* | 8/2004 | Huang et al. ................. 414/799 |
| 2005/0098940 A1* | 5/2005 | Malatesta .................... 271/121 |
| 2007/0147980 A1* | 6/2007 | Gerke ....................... 414/797.2 |
| 2007/0188324 A1 | 8/2007 | Ballin |
| 2007/0212208 A1 | 9/2007 | Hansl |
| 2009/0169349 A1 | 7/2009 | Reed |
| 2009/0269183 A1 | 10/2009 | Hollinrake et al. |
| 2010/0066014 A1* | 3/2010 | Brewer et al. ................. 271/297 |

FOREIGN PATENT DOCUMENTS

| | | | |
|---|---|---|---|
| SU | 1062154 A1 | 12/1983 | |
| WO | 2004050518 | 6/2004 | |
| WO | WO 2008014532 A1 * | 2/2008 | ............ B65G 59/02 |

OTHER PUBLICATIONS

Translation of Russian Official Decision of Grant for corresponding Russian Application No. 2012140304 filed Apr. 22, 2011 (15 pages).

* cited by examiner

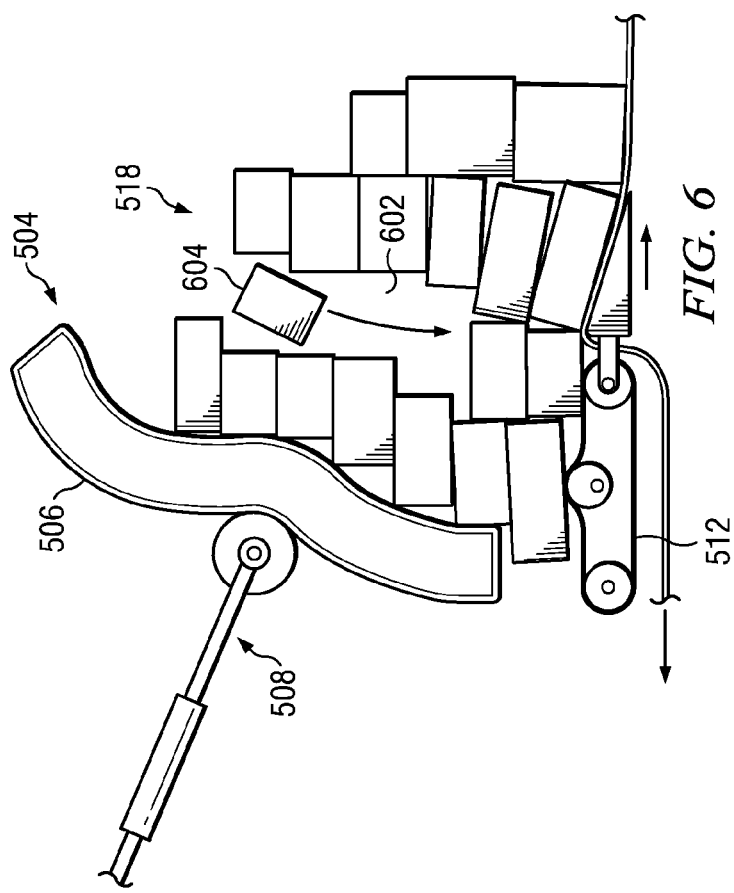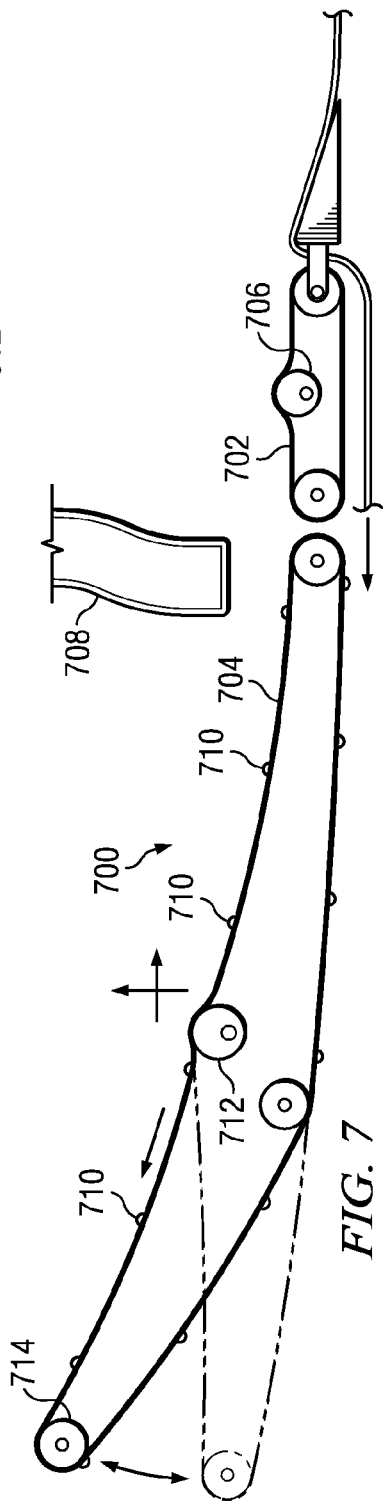

AUTOMATED BED-LOADED CONTAINER UNLOADER AND METHOD

CROSS-REFERENCE TO RELATED APPLICATIONS

The present application is related to, and claims priority to, U.S. Provisional Patent Application No. 61/326,876, filed Apr. 22, 2010, which is hereby incorporated by reference into the present application as if fully set forth herein.

TECHNICAL FIELD

The present disclosure is directed, in general, to mail and parcel processing techniques.

BACKGROUND OF THE DISCLOSURE

Improved and more efficient systems for unloading items from a container or trailer are desirable.

SUMMARY OF THE DISCLOSURE

Various disclosed embodiments include an automated unloading apparatus, system and method. In one embodiment, an automated unloading apparatus for use with a container having a plurality of items located on a base belt includes a ramp, a conveyor, a stack control curtain, and a tensioning mechanism. The ramp is configured to pass under the base belt. The conveyor is configured to remove a first item from the plurality of items. The stack control curtain is configured to retain a second item of the plurality of items during removal of the first item. The tensioning mechanism is configured to couple to the base belt and maintain a desired tension on the base belt during passage of the nose ramp under the base belt and removal of the first item.

In another embodiment, an automated unloading system for use with a container having a plurality of items located on a base belt includes an operator console, a controller, and an automated unloading apparatus. The controller is communicatively coupled to the operator console and the automated unloading apparatus is communicatively coupled to the controller. The automated unloading apparatus includes a ramp, a conveyor, a stack control curtain, and a tensioning mechanism. The ramp is configured to pass under the base belt. The conveyor is configured to remove a first item from the plurality of items. The stack control curtain is configured to retain a second item of the plurality of items during removal of the first item. The tensioning mechanism is configured to couple to the base belt and maintain a desired tension on the base belt during passage of the nose ramp under the base belt and removal of the first item. The controller is configured to control operation of the automated unloading apparatus in response to an operator action at the operator console.

In still another embodiment, a method of unloading items from a container having a plurality of items located on a base belt includes moving a ramp of an automated unloading apparatus under the base belt and a first item of the plurality of items. The method also includes positioning a stack control curtain of the automated unloading apparatus to retain a second item of the plurality of items. The method further includes removing the first item from the plurality of items using a conveyor of the automated unloading apparatus. The method also includes maintaining a desired tension on the base belt using a tensioning mechanism during passage of the nose ramp under the base belt and removal of the first item.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 6 depicts a detail schematic view of a stack control curtain mechanism according to the disclosure;

FIG. 7 depicts a schematic view of a ramping conveyor according to the disclosure;

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In an effort to increase load density and reduce transportation cost, the trucking industry may use a practice called "bed-loading". A trailer may be loaded with items of a broad range of sizes, weights, and shapes. Sacks and items having extreme aspect ratios or weights are typically bed-loaded last in a separate area of the trailer or box bed. On a full trailer, such extreme pieces may be located near the trailer door and would be the first items unloaded.

Manually unloading a bed-loaded trailer can be a grueling job that may be performed at extreme temperatures with relatively low pay. A person unloading standard packages with the aid of an extendible conveyor may achieve sustained rates in the range of 1,000 pieces per hour (1K PPH). Sacks and items of irregular size/shape are typically unloaded at rates much less than standard packages. Such reduced rates are often 200-500 PPH, depending on weight, shape, door configuration, and other factors. The time required to load or unload a trailer directly affects dock door utilization/productivity and therefore facility size. Problems have arisen with previous attempts to automated trailer unloading, including solution cost, cube loss, trailer fleet modification, throughput, staffing, package size/type/formats, loading constraints/configuration, package damage, ease of operation/automation, cost to maintain and ease of retrofitting existing loading dock facilities.

Various disclosed embodiments include unloading items from a trailer or other container generally without operator intervention. A nose ramp of an automated unloading apparatus is moved under a base belt in the trailer and wider a first item of a plurality of items in the trailer. As the ramp continues advancing, the item is moved onto a conveyor, which is adapted to carry the item out of the trailer. A stack control curtain maintains the remaining items in a stack or pile during and after removal of the first item. A tensioning mechanism maintains a desired tension on the base belt as the ramp moves under the base belt and the first item.

Figure 1:
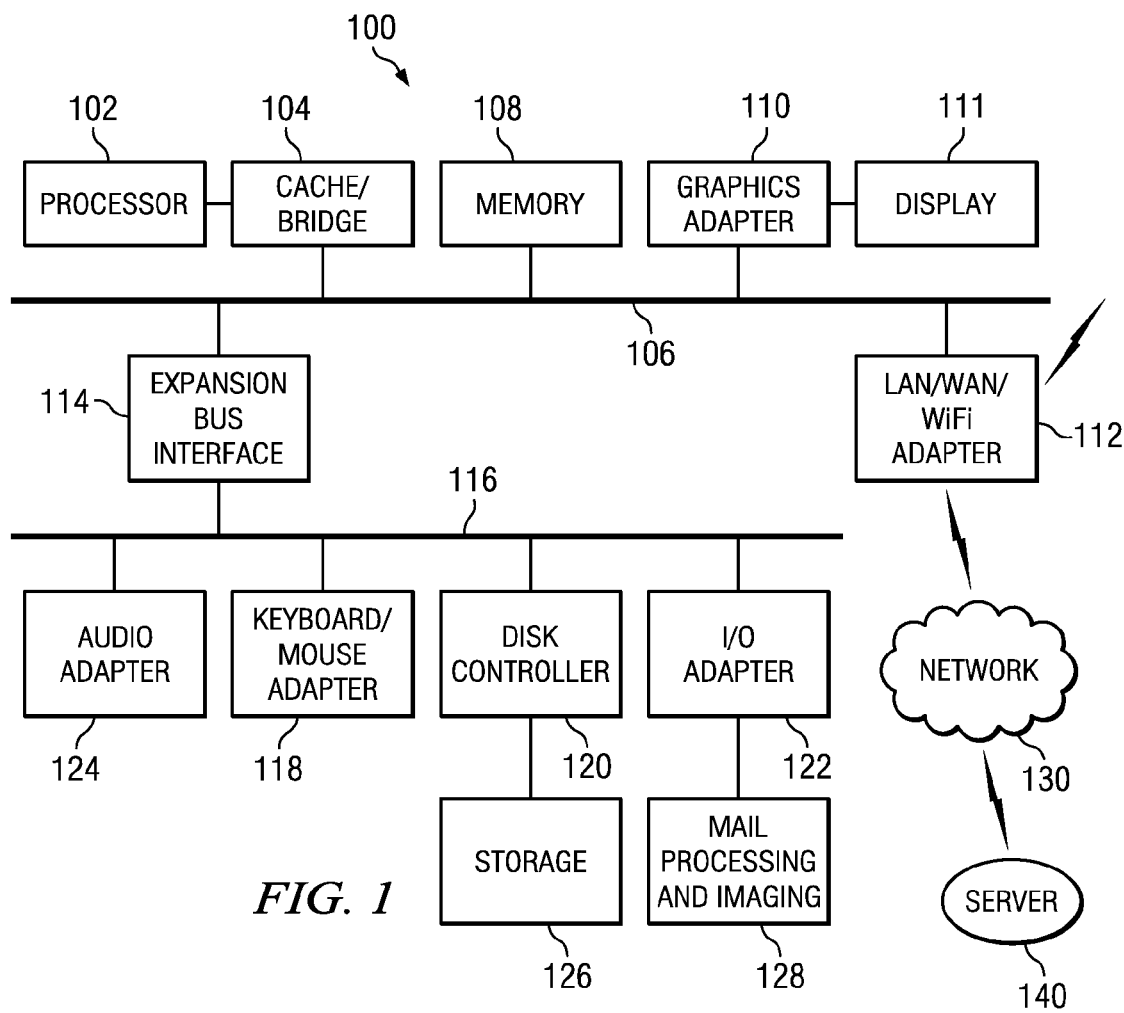
FIG. 1 depicts a block diagram of a data processing system in which an embodiment can be implemented.

FIG. 1 depicts a block diagram of a data processing system 100 in which an embodiment can be implemented, for example as a control system for a mechanism as described below, and can be configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 122 can be connected to mail processing and imaging devices 128, as described herein, to image, scan, transport, label, address process, sort, and otherwise processes the mail pieces in accordance with the various embodiments described herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. LAN/WAN/Wireless adapter 112 can also communicate with packages as described herein, and perform other data processing system or server processes described herein. Data processing system 100 can communicate over network 130 with one or more server systems 140, which are also not part of data processing system 100, but can be implemented, for example, as separate data processing systems 100. A server system 140 can be, for example, a central server system at a central mail processing facility.

Figure 2:
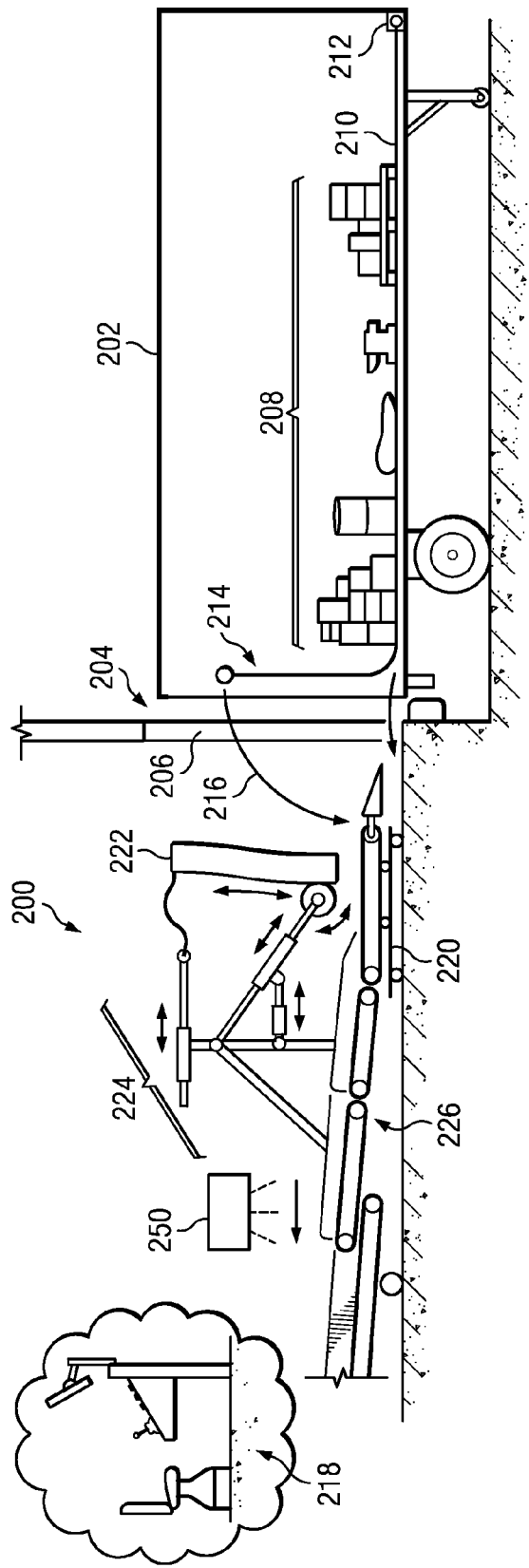
FIG. 2 depicts a schematic view of an automated unloading apparatus according to the disclosure.

FIG. 2 depicts a schematic view of an automatic unloader 200 according to the present disclosure. A trailer 202 is positioned adjacent to a loading dock 204 and a dock door area 206 for unloading. Within the trailer 202 are loaded items 208, which are to be unloaded by the automatic unloader 200. The items 208 are positioned on top of a base belt 210, a first end of which is attached to the trailer at an attachment point 212. A second end of the base belt 210 (opposite to the first end) may be raised to a first transit position 214 to provide supported to stacked items during transit to help prevent stack collapse. The second end of the base belt 210 may alternately be placed in a second transit position (not shown in FIG. 2) on the floor of the trailer 202, where the base belt 210 may be rolled or gathered during transit. From either the first or second transit position, to initiate unloading of the trailer 202, the second end of the base belt 210 is brought generally along the path indicated by the arrow 216 to be attached to the automatic unloader 200, as described in greater detail below.

The unloader 200 is positioned at the open door of the trailer 202 by an operator at an operator console 218. The operator may use a video camera (not shown in FIG. 2) that is mounted to the unloader 200 or to the loading dock 204 and presents the operator with a view of the unloader 200 and the trailer 202. The unloader includes a positioning mechanism 220, which is remotely operated by the operator to position the unloader 200 at the entrance to the trailer 202. The positioning mechanism 220 may be a motorized caster or other mechanism suitable for positioning the unloader 200 relative to the trailer 202 into prior to initiating an unloading process or during the unloading process. The positioning mechanism 220 is operable to position the unloader 200 at least along a longitudinal axis of the trailer 202 or horizontally relative to the trailer 202. In some embodiments, the unloader 200 is substantially the same width as the interior of the trailer 202, such that the unloader 200 substantially fills the trailer 202 from one sidewall to the other sidewall.

The unloader 200 also includes a stack control curtain 222 mounted to a positioning mechanism 224. The operation of the stack control curtain 222 and the positioning mechanism 224 will be explained in greater detail with reference to FIGS. 5 and 6. The unloader 200 is coupled to an extendible conveyor 226, which is operable to carry items unloaded by the unloader 200 from the trailer 202. A sensor 250 may be mounted in a position that enables the sensor 250 to sense items on the unloader 200 or the extendible conveyor 226. The sensor 250 is operable to sense a label, RFID tag, barcode, or other identifying feature of such items.

Figure 3:
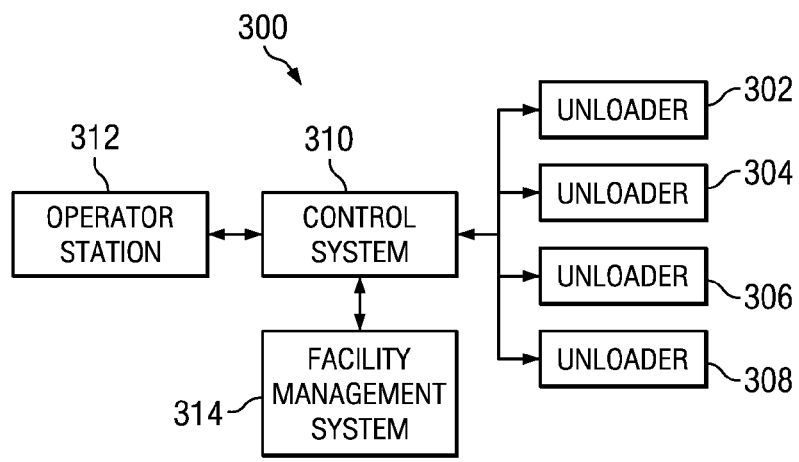
FIG. 3 depicts an automated unloading system according to the disclosure.

FIG. 3 depicts an automated unloading system 300 according to the disclosure. Unloaders 302, 304, 306 and 308 according to the disclosure are controlled by a controller 310. Each of the unloaders 302-308 may be positioned at each of four truck docks and operated to unload four trailers separately or concurrently. An operator may use an operator console 312 to control the unloaders 302-308. The controller 310 may be communicatively coupled to a facility management system 314. The controller 310 may receive address or identification information sensed from items unloaded by one or more of the unloaders 302-308 and send the information to the facility management system 314 (or other external system) for its use in routing the items to desired destinations.

While the operator console 312, the controller 310, and the facility management system 314 are depicted in FIG. 3 as separate elements of the automated unloading system 300, it will be understood that in other embodiments, this functionality of these elements may be provided in one or two elements. In some embodiments, the automated unloading system 300 also includes one or more sensors (not shown in FIG. 3) providing a view of one or more of the unloaders 302-308 and one or more corresponding trailers or other containers. In such embodiments, the controller 310 is further adapted to control an unloader positioning mechanism to position the unloader in a desired position relative to the trailer, prior to initiating an unloading process.

Figure 4:
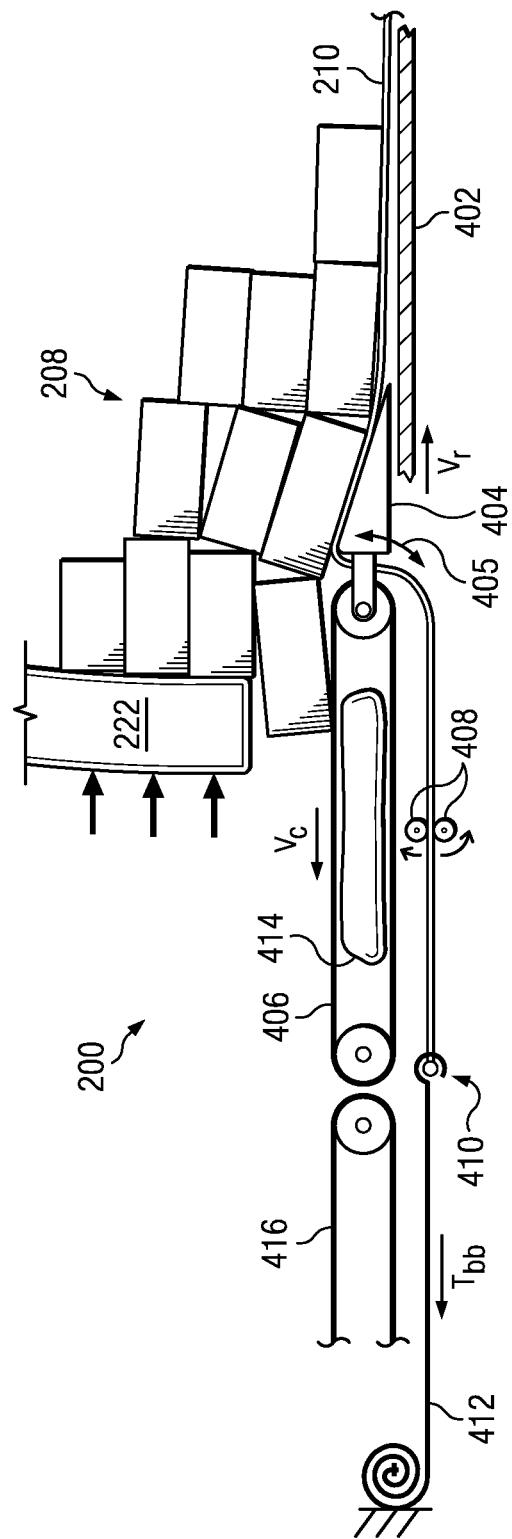
FIG. 4 depicts a schematic detail view of the automated unloading apparatus of FIG. 2.

FIG. 4 depicts a schematic detail view of the automatic unloader system 200. The base belt 210 has been routed over a nose ramp 404, between the nose ramp 404 and a nose conveyor 406, through pinch rollers 408, and coupled at coupling 410 to a tensioning roller 412. The pinch rollers 408 and the tensioning roller 412 comprise a tensioning mechanism for the base belt 210. The nose ramp 405 may pivot about a horizontal axis, as indicated by arrow 405. The tensioning roller 412 maintains a desired tension $T_{bb}$ on the base belt 210 via the coupling 410. The unloader 200 moves itself forward under the base belt 210 and loaded items 208 by using the pinch rollers 408 to pull on the base belt 210. In other embodiments, the unloader 200 moves itself forward using the positioning mechanism 220 and the tensioning roller 412 operates to maintain the base belt 210 taut over the nose ramp 404. The tensioning roller 412 is mounted in a fixed position relative to the loading dock 204, in order to maintain the tension $T_{bb}$ on the base belt 210 regardless of movement of the unloader 200.

The unloader 200 moves into the trailer along the trailer floor 402, sliding the nose ramp 404 under a rearmost item of the items 208. By sliding the nose ramp 404 under an item while the item remains on the base belt 210, the unloader 200 reduces the possibility of the nose ramp 404 pushing the item into the trailer, rather than sliding it up onto the nose conveyor 406. When moving forward, the unloader 200 moves at a speed $V_r$ that substantially matches a speed $V_c$ of a transport belt of the nose conveyor 406. In this way, the items 208 are transferred with substantially no relative motion from the base belt 210 to the nose conveyor 406. Once on the nose conveyor 406, a lowest, rearmost item of the items 208 is carried under the stack curtain 222 out of the trailer 202 along the nose conveyor 406, onto the takeaway conveyor 416, toward the extendible conveyor 226. An upper portion of the transport belt of the nose conveyor 406 may be supported by a cushion 414, to reduce impact forces on items that fall onto the nose conveyor from the items 208.

As will be described in greater detail below, the stack curtain 222 may be moved toward and away from the items 208 in order to break the lowest, rearmost item free of any item resting upon it, to enable the item to be carried away by the nose conveyor 406. The stack curtain 222 may be moved to a higher position above the nose conveyor 406, to permit a larger item to pass under the stack curtain 222. The stack curtain 222 may be positioned rearward along the nose conveyor, farther from the nose ramp 404, in order to expose a larger portion of the nose conveyor 406, to permit a larger item to rest entirely upon the nose conveyor 406 and be carried away. The unloader 200 is operable to remove a diversity of items 208 (e.g., packages, irregular shapes/weights, sacks, containers, rolling stock, pallets, etc.) from the trailer 202 or other container, whether the items 208 are arranged in orderly, segregated stacks or intermingled in disordered piles.

Figure 5:
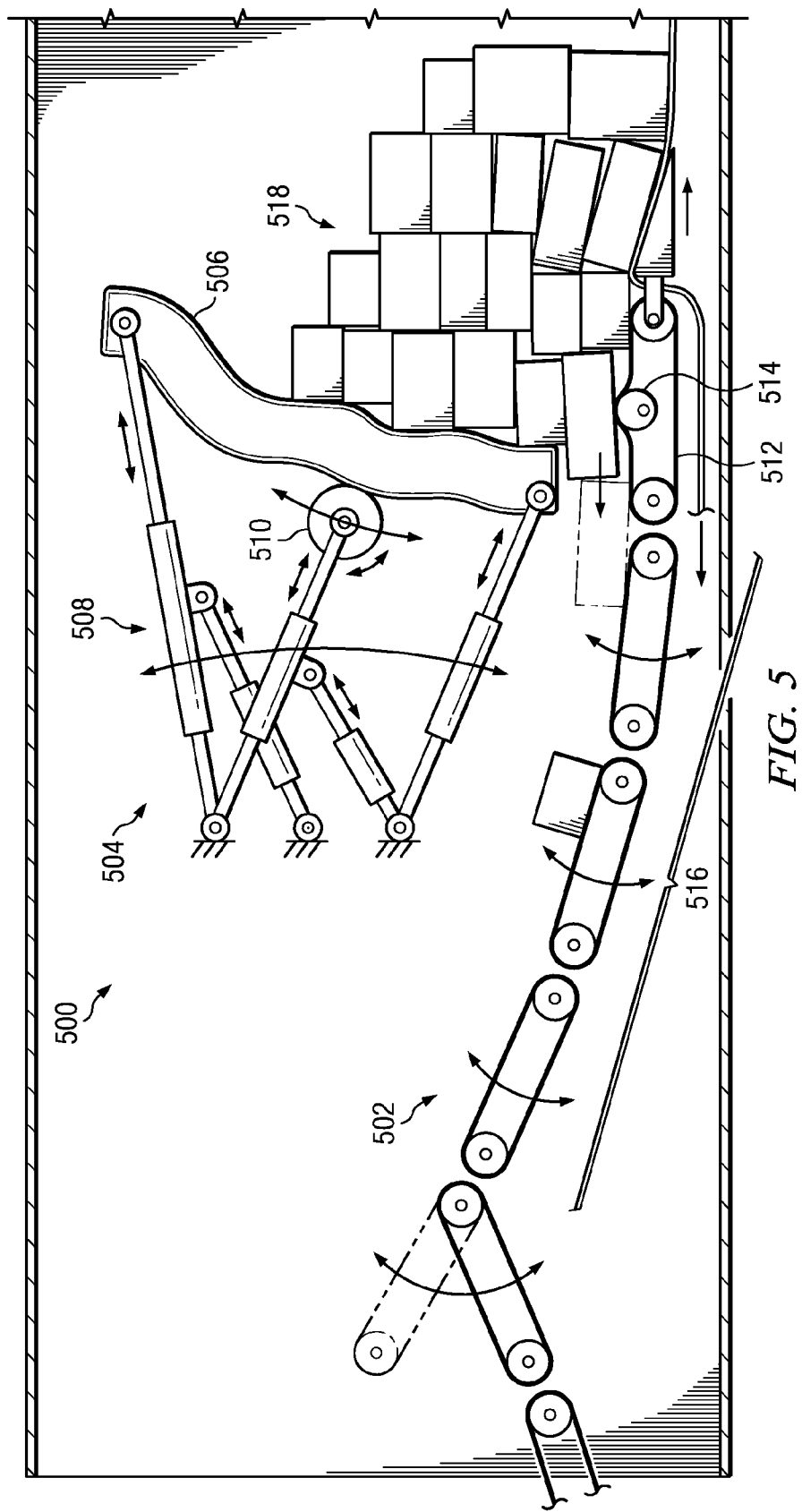
FIG. 5 depicts a schematic view of a second automated unloading apparatus according to the disclosure.

FIG. 5 depicts a schematic view of another automatic unloader 500 according to the present disclosure. The unloader 500 includes a segmented drive ramp 502 and a stack control curtain mechanism 504. The stack control curtain mechanism 504 includes a cushioned stack control curtain 506 and one or more actuators 508 adapted to change a configuration of the stack control curtain 506 relative to items 518. The actuators are operable to independently move the top and bottom of the stack control curtain 506 toward and away from the nose of the trailer 202, as well as to vary a contour of the stack control curtain 506 using a roller 510 or other suitable actuator.

The segmented drive ramp 502 includes a nose conveyor 512 and ramping conveyor segments 516. The nose conveyor 512 has a cam roller 514, which rotates on a longitudinal axis that is not coincident with a geometric longitudinal axis of the roller 514. As the cam roller 514 rotates, it raises and lowers an upper portion of a transport belt of the nose conveyor 512. The cam roller 514 operates to jostle or otherwise disturb the items 518 positioned on the nose conveyor 512, to facilitate removal of a lowest item by the nose conveyor 512. The cushioned stack control curtain 506, the nose conveyor 512, and the ramping conveyor segments 516 manage stack decomposition and reduce free fall distance and impact force for the items 518.

A ramping angle and terracing effect may be created by the ramping conveyor segments 516. As the segmented drive ramp 502 advances deeper into the stack, the ramping conveyor segments 516 may be raised and controlled relative to raising the stack control curtain mechanism 504 to allow package flow between the surface of the segmented drive ramp 502 and the bottom edge of the cushioned stack control curtain 506. As the segmented drive ramp 502 advances into the stack, items are removed at higher and higher levels. The conveyor segments 516 turn on and off to reduce forces between packages and to cancel relative motion between conveyor and package until drive forces are needed The cam roller 514 is mounted below an upper portion of a transport belt of the nose conveyor 512. Cam rollers may also be mounted below upper portions of one or more of the conveyor segments 516 to aid package flow. Pressure and coverage applied by the stack control curtain 506 to the stack is kept within an acceptable range by the actuators 508 to avoid package free fall while not inducing excessive forces or forces that might damage the items 518. A variety of devices know in the art can sense and signal pressure levels. Pressures applied over a small area or at a single point are avoided by making the stack control curtain 506 from a thick cushioned and/or compliant material, such as laminated foam rubber.

FIG. 6 depicts a detail schematic view of the stack control curtain mechanism 504 according to the disclosure. The stack control curtain 506 is moved into a desired configuration by the actuators 508. As individual items are removed from the bottom of the stack or pile of items 518, an internal void 602 may be created within the stack. Where the items are in an otherwise orderly stack or array, such a void may allow an item 604 to drop into the internal void, possibly damaging the item 604 or an item on which it lands, or creating a jam that prevents subsequent items 518 from being removed from the trailer 202. Internal voids may create similar unloading problems is unordered piles of items 518. Under control of the actuators 508, the stack control curtain 506 is adapted to change configuration to prevent formation of internal voids in the stack or pile of items 518.

FIG. 7 depicts a schematic view of a ramping conveyor 700 according to the present disclosure. The ramping conveyor 700 includes a nose conveyor 702 and a variable incline angle conveyor 704. The ramping conveyor 700 supports items on conveyor belts, rather than on underlying solid support structures. The nose conveyor 702 includes a cushioned cam roller 706 that raises and lowers an upper portion of the nose conveyor 702, to break items loose from a stack or pile of items. A stack control curtain 708 restrains upper items of the stack or pile and allows single items to pass from the nose conveyor 702 to the variable incline angle conveyor 704. As may be seen by comparing depicted positions of the stack control curtains 222, 506 and 708 in FIGS. 2, 4, 5 and 7, a stack control curtain according to the disclosure may be moved to multiple desired positions above a nose conveyor and other conveyor segments of unloaders according to the disclosure.

The variable incline angle conveyor 704 may include raised cleats 710 to prevent items on the conveyor 704 from slipping back toward the trailer as an angle from the horizontal of the conveyor 704 is increased. The conveyor 704 may include a cushioned cam roller 712 to control clumping and spacing of items on the conveyor 704. The conveyor 704 includes a roller 714 that may be raised and lowered to vary an angle from the horizontal of an upper portion of the variable incline angle conveyor 704. The suspended belt of the conveyor 704 provides a forgiving surface for items that it transports, to reduce damage to the items. Similar results may be obtained through the use of foam cushions or air bladders beneath the upper portion of the conveyor 704.

The conveyor 704 is generally inclined to cause layers of tall stacks of items to decompose due to gravity. This thinning of layers provides natural metering of package flow for easier hand off from discharge of the conveyor 704 to generally narrower downstream takeaway conveyors. At an opposite end of the conveyor 704 from the nose conveyor 702, the angle is selectively changed to produce a wedge-like engagement of the nose conveyor 702 with items of the stack to facilitate stack decomposition and removal. Similar comments apply to the ramping segmented drive ramp 502 of the unloader 500 depicted in FIG. 5.

Figure 8:
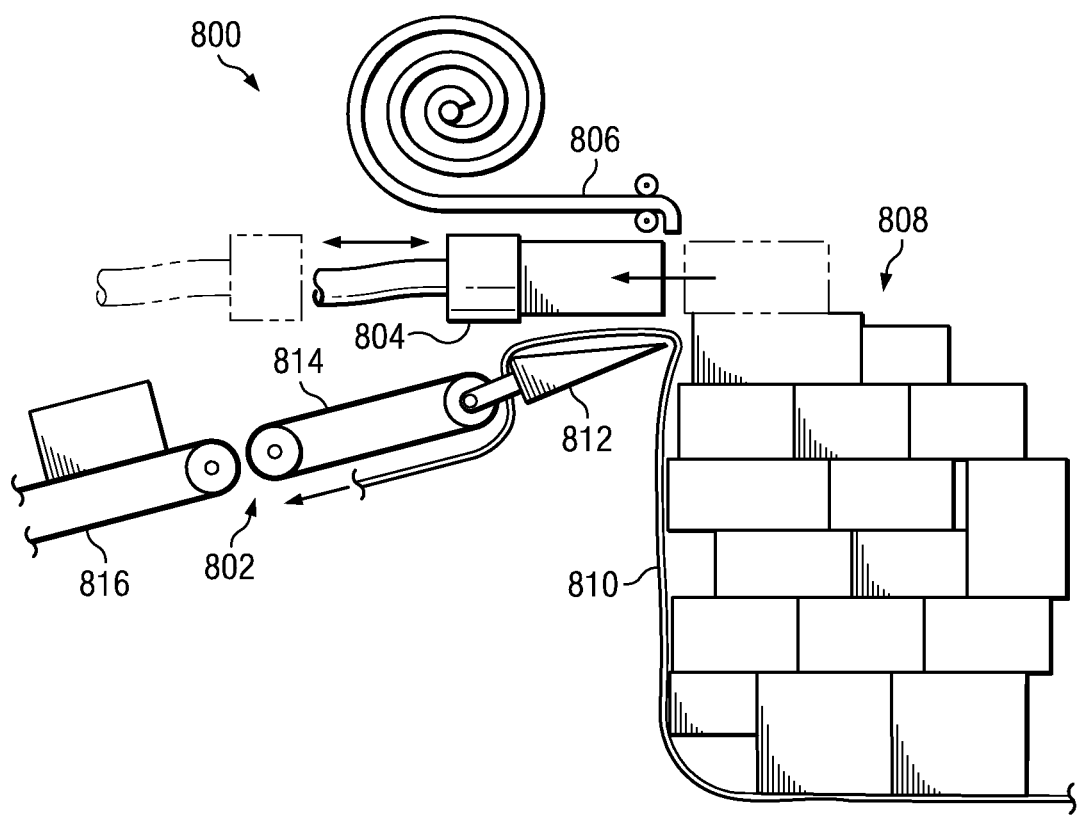
FIG. 8 depicts a schematic view of another automated unloading apparatus according to the disclosure.

FIG. 8 depicts a schematic view of another automatic unloader 800 according to the present disclosure. The unloader 800 includes a conveyor mechanism 802, an item removal mechanism 804, an upper stack control curtain 806, and a lower stack control curtain 810. The unloader 800 unloads items 808 from an upper portion of a stack or pile. The upper portion may be a top, or near the top, of the stack. The lower stack control curtain 810 passes over a nose ramp 812, and is placed under tension to control a lower portion of the stack of items 808. The item removal mechanism 804 pulls individual items from the top of the stack of items 808 over the nose ramp 812 and onto a nose conveyor 814, which transports the items to a take-away conveyor 816. The item removal mechanism 804 may be a vacuum head, a magnetic head, a hook, or other suitable mechanism for mechanically coupling to an item and pulling the item onto the nose conveyor 814. The relative positions of the item removal mechanism 804 and the nose ramp 812 manages stack decomposition and minimizes free fall distance and resulting impact force. As the top of the stack of items 808 is cleared the conveyor mechanism 802 is lowered down the face of the stack. The lower stack control curtain 810 is kept taut to continue controlling the lower portion of the stack of items 808. The item removal mechanism 804 is mechanically coupled to, and moves with, the conveyor mechanism 802, as the conveyor mechanism 802 moves vertically along the stack of items 808 and horizontally into the trailer (or other container).

As the conveyor mechanism 802 is lowered down the face of the stack, the upper stack control curtain 806 is extended downward to further control the stack of items 808 by forming a barrier against items falling from the stack onto the nose ramp 812. The upper stack control curtain 806 may be positioned farther forward than the lower stack control curtain 810, to be positioned adjacent to, and control, a remaining upper portion of the stack of items 808. When the conveyor mechanism 802 reaches the bottom of the stack of items 808, the conveyor mechanism 802 advances to a face of the remaining portion of the stack of items 808. The conveyor mechanism 802 is raised to the top, or near the top, of the stack and unloading by the item removal mechanism 804 resumes. As the conveyor mechanism 802 is raised, the lower stack control curtain 810 is extended to control the lower portion of the stack, and the upper stack control curtain 806 is retracted.

Figure 9:
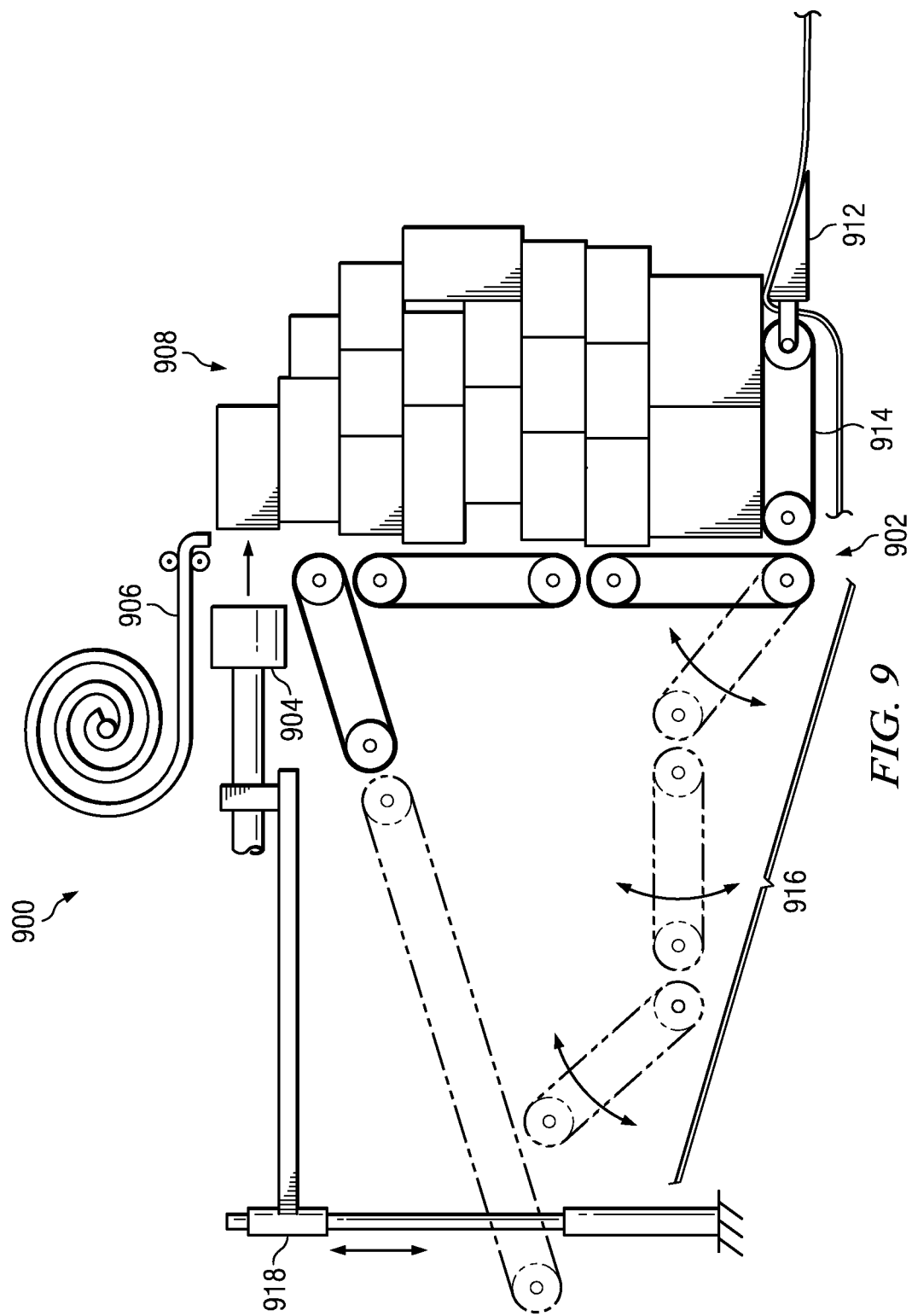
FIG. 9 depicts a schematic view of still another automated unloading apparatus according to the present disclosure.

FIG. 9 depicts a schematic view of another automatic unloader 900 according to the present disclosure. The unloader 900 includes a conveyor mechanism 902, a vacuum head 904, and an upper stack control curtain 906. The conveyor mechanism 902 includes a nose ramp 912, a nose conveyor 914 and a segmented take-away conveyor 916. The nose conveyor 914 and/or some or all segments of the segmented take-away conveyor 916 may be cushioned, as described with reference to nose conveyor 406 shown in FIG. 4. The unloader 900 unloads items 908 from an upper portion of a stack or pile. The upper portion may be a top, or near the top, of the stack. Segments of the segmented take-away conveyor 916 are initially raised to a substantially vertical configuration to control a lower portion of the stack of items 908.

The vacuum head 904 pulls individual items from the top of the stack of items 908 onto a currently uppermost segment of the segmented take-away conveyor 916. The relative positions of the vacuum head 904 and the currently uppermost segment of the segmented take-away conveyor 916 manages stack decomposition and minimizes free fall distance and resulting impact force. As the top of the stack of items 908 is cleared segments of the segmented take-away conveyor 916 are repositioned to reduce the height of the segmented take-away conveyor 916 along the face of the stack. The remaining substantially vertical elements of the segmented take-away conveyor 916 control the lower portion of the stack of items 908. The vacuum head 904 is mechanically coupled to, and moves with, the conveyor mechanism 902, as the conveyor mechanism 902 moves horizontally into the trailer (or other container). The vacuum head 904 is coupled to the conveyor mechanism 902 by a linkage 918 that is operable to raise and lower the vacuum head 904.

As the segments of the segmented take-away conveyor 916 are repositioned to reduce the height of the segmented take-away conveyor 916 along the face of the stack, the upper stack control curtain 906 is extended downward to further control the stack of items 908 by forming a barrier against items falling from the stack onto the segmented take-away conveyor 916. The upper stack control curtain 906 may be positioned farther forward than the substantially vertical elements of the segmented take-away conveyor 916, to be positioned adjacent to, and control, a remaining upper portion of the stack of items 908. When the vacuum head 904 reaches the bottom of the stack of items 908, the conveyor mechanism 902 advances to a face of the remaining portion of the stack of items 908. The vacuum head 904 is raised to the top, or near the top, of the stack and unloading by the vacuum head 904 resumes. As the vacuum head 904 is raised, segments of the segmented take-away conveyor 916 are returned to a substantially vertical configuration to control a lower portion of the stack of items 908, and the upper stack control curtain 906 is retracted.

Those skilled in the art will recognize that, for simplicity and clarity, the hill structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs), in particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. An automated unloading apparatus comprising:
   a ramp configured to pass under a base belt, the base belt located in a container and attached at a first end to an interior of the container, wherein a plurality of items are located in the container and stacked on the base belt;
   a conveyor configured to remove a first item from the plurality of items;
   a stack control curtain configured to retain a second item of the plurality of items during removal of the first item; and
   a tensioning mechanism configured to couple to a second end of the base belt and maintain a desired tension on the base belt during passage of the nose ramp under the base belt and removal of the first item as the automated unloading apparatus travels along the base belt into the interior of the container.

2. The automated unloading apparatus of claim 1, wherein the tensioning mechanism is further configured to move the ramp under the first item.

3. The automated unloading apparatus of claim 1, wherein the stack control curtain is further configured to change a position relative to the conveyor to permit removal of the first item by the conveyor.

4. The automated unloading apparatus of claim 1, wherein the stack control curtain is further configured to change a configuration relative to the plurality of items to prevent formation of internal voids in the plurality of items.

5. The automated unloading apparatus of claim 1, further comprising an item removal mechanism configured to pull the first item over the ramp onto the conveyor.

6. The automated unloading apparatus of claim 1, wherein the conveyor includes a mechanism configured to jostle at least some of the plurality of items.

7. The automated unloading apparatus of claim 1, further comprising a positioning mechanism configured to position the automated unloading apparatus relative to the container.

8. An automated unloading system comprising:
   an operator console;
   a controller communicatively coupled to the operator console; and
   an automated unloading apparatus communicatively coupled to the controller, the automated trailer unloader including:
   a ramp configured to pass under a base belt, the base belt located in a container and attached at a first end to an interior of the container, wherein a plurality of items are located in the container and stacked on the base belt,
   a conveyor configured to remove a first item from the plurality of items, a stack control curtain configured to retain a second item of the plurality of items during removal of the first item, and a tensioning mechanism configured to couple to a second end of the base belt and maintain a desired tension on the base belt during passage of the nose ramp under the base belt and removal of the first item as the automated unloading apparatus travels along the base belt into the interior of the container, wherein the controller is configured to control operation of the automated unloading apparatus in response to an operator action at the operator console.

9. The automated unloading system of claim 8, wherein the automated trailer unloader further comprises a sensor configured to sense an identifying feature of the first item, and the controller is further configured to communicate information relating to the sensed identifying feature to an external system.

10. The automated unloading system of claim 8, wherein the automated trailer unloader further comprises a positioning mechanism, and the controller is further configured to move the automated trailer unloader into a desired position relative to the container using the positioning mechanism.

11. The automated unloading system of claim 8, wherein the tensioning mechanism is further configured to move the ramp under the first item.

12. The automated unloading system of claim 8, wherein the stack control curtain is further configured to change a position relative to the conveyor to permit removal of the first item by the conveyor.

13. The automated unloading system of claim 8, wherein the stack control curtain is further configured to change a configuration relative to the plurality of items to prevent formation of internal voids in the plurality of items.

14. The automated unloading system of claim 8, wherein the automated unloading apparatus further includes an item removal mechanism configured to pull the first item over the ramp onto the conveyor.

15. The automated unloading system of claim 8, wherein the automated unloading apparatus further includes a mechanism configured to jostle at least some of the plurality of items.

16. A method of unloading items from a container having a plurality of items located on a base belt, the method comprising:

moving a ramp of an automated unloading apparatus under a base belt and a first item of the plurality of items, wherein the base belt is located in the container and attached at a first end to an interior of the container, and wherein the plurality of items are located in the container and stacked on the base belt;

positioning a stack control curtain of the automated unloading apparatus to retain a second item of the plurality of items;

remove the first item from the plurality of items using a conveyor of the automated unloading apparatus; and maintaining a desired tension on the base belt using a tensioning mechanism during passage of the nose ramp under the base belt and removal of the first item as the automated unloading apparatus travels along the base belt into the interior of the container.

17. The method of claim 16, further comprising moving the ramp under the first item using the tensioning mechanism.

18. The method of claim 16, further comprising changing a position of the stack control curtain relative to the conveyor to permit removal of the first item by the conveyor.

19. The method of claim 16, further comprising changing a configuration of the stack control curtain relative to the plurality of items to prevent formation of internal voids in the plurality of items.

20. The method of claim 16, wherein remove the first item from the plurality of items includes jostling at least some of the plurality of items.

21. The method of claim 16, further comprising positioning the automated unloading apparatus relative to the container using a positioning mechanism.

* * * * *